United States Patent [19]

Brunken et al.

[11] Patent Number: 5,316,799
[45] Date of Patent: * May 31, 1994

[54] METHOD FOR APPLYING PAINT WITH A WATER REPELLANT COMPOSITION

[75] Inventors: Dean E. Brunken, Edmond; Arnulf P. Hagen, Noble, both of Okla.

[73] Assignee: Advanced Chemical Technologies, Inc., Oklahoma City, Okla.

[ * ] Notice: The portion of the term of this patent subsequent to Jun. 5, 2007 has been disclaimed.

[21] Appl. No.: 969,658

[22] Filed: Oct. 30, 1992

[51] Int. Cl.⁵ .............................................. B05D 1/02
[52] U.S. Cl. .................................... 427/421; 427/387; 427/343.4; 427/393.6; 428/540; 528/10
[58] Field of Search ................... 427/393.4, 393.6, 421, 427/387; 428/540; 528/60

[56] References Cited

U.S. PATENT DOCUMENTS

| | | | |
|---|---|---|---|
| 4,339,581 | 7/1982 | Totten et al. | 546/14 |
| 4,342,796 | 8/1982 | Brown et al. | 427/136 |
| 4,931,319 | 6/1990 | Stout et al. | 427/421 |
| 4,960,615 | 10/1990 | Stout et al. | 427/160 |
| 5,066,520 | 11/1991 | Freibecrg et al. | 427/393.6 X |
| 5,068,132 | 11/1991 | Brunken et al. | 427/421 |
| 5,075,140 | 12/1991 | Stout et al. | 427/387 |
| 5,110,684 | 5/1992 | Cooper | 427/393.6 X |
| 5,120,581 | 6/1992 | Brunken et al. | 427/387 |

OTHER PUBLICATIONS

Brochure entitled, "Sil-Act Alkyltrialkoxy Silane ...", 1987.
Brochure entitled "Sil-Act Silane Weatherproofing Penetrant ...," 1990.

Primary Examiner—Michael Lusignan
Attorney, Agent, or Firm—Dunlap, Codding & Lee

[57] ABSTRACT

Methods for treating siliceous and carbon central structures with a water repellant composition and a paint are provided. An effective amount of water repellant composition is dispersed in paint or in paint and water, and the mixture then is applied in a continuous process after mixing to the object to be treated.

52 Claims, 1 Drawing Sheet

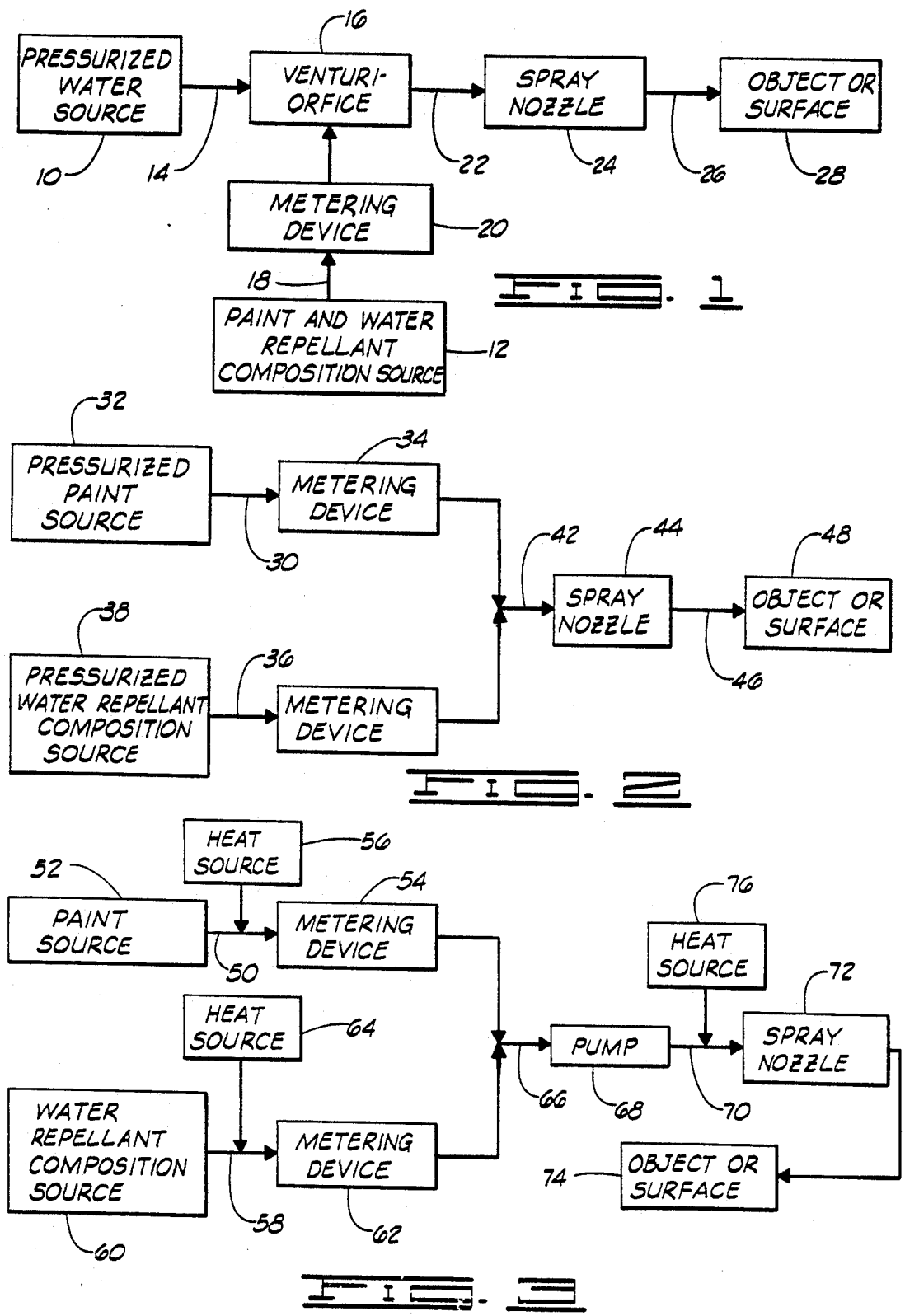

METHOD FOR APPLYING PAINT WITH A WATER REPELLANT COMPOSITION

FIELD OF THE INVENTION

The present invention relates generally to methods for applying water repellant compositions to objects or surfaces, and more particularly to a method for applying a water repellant composition to a object or surface utilizing or cooperating with a paint.

BRIEF DESCRIPTION OF THE DRAWINGS

FIG. 1 is a schematic representation of one embodiment of the method of the present invention.

FIG. 2 is a schematic representation of a system showing one other embodiment of the present invention.

FIG. 3 is a schematic representation of yet another embodiment of the method of the present invention.

DESCRIPTION OF THE PREFERRED EMBODIMENTS

The present invention provides a method for treating siliceous objects or surfaces and/or carbon central objects or surfaces with a water repellant composition utilizing a water based paint or a solvent based paint and a water carrier applied to an object or surface in a continuous process.

"Water based paint", as used herein means a substance containing a pigment or coloring matter suspended in a liquid medium consisting primarily of water and applied as a protective or decorative coating to an object or surface, and including the dried surface pigment or coloring matter and residual materials, such as, for example, fillers and emulsifiers. "Water based paint" also includes the components of water based paint, such as, for example, the pigment or coloring matter, before water has been added.

"Solvent based paint" as used herein means a substance containing a pigment or coloring matter suspended in a nonaqueous solvent, such as ethanol, and applied as a protective or decorative coating to an object or surface, and including the dried surface pigment or coloring matter and residual materials, such as, for example, fillers and emulsifiers. "Solvent based paint" also includes the components of solvent based paint, such as, for example, the pigment or coloring matter, before nonaqueous solvent has been added.

It is understood that the terms "water based paint", "solvent based paint", and variations thereof are used inclusively, not by way of limitation, and are intended to encompass decorative or protective coloring and/or penetrating agents, including varnishes, stains, lacquers, and the like, that are intended to be painted, sprayed, or otherwise disposed upon objects or surfaces. Additionally, any of these substances may be referred to herein as "paint".

The water repellant compositions used in the present invention may be any commercially available water repellant composition. More particularly, the water repellant composition preferably is a silane or siloxane or combinations thereof (sometimes referred to herein as "the active ingredient").

Silane is represented by the general formula:

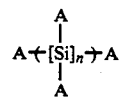

wherein Si is silicon; n is a positive integer; and A is selected from the group consisting of H, R, X, or Y wherein H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substitutent contains from about 4 to about 8 carbon atoms, the aklyl substituent contains up to about 8 carbon atoms and the alkenyl substituent contains up to about 8 carbon atoms, wherein Y may be substituted with an X, and wherein R may be substituted with an X.

The siloxane is represented by the general structure or formula:

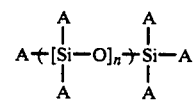

wherein Si is silicon; 0 is oxygen; n is a positive integer; and A is selected from the group consisting of H, R, X, or Y, wherein H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substitutent contains from about 4 to about 8 carbon atoms, the aklyl substituent contains up to about 8 carbon atoms and the alkenyl substituent contains up to about 8 carbon atoms, wherein Y may be substituted with an X, and
wherein R may be substituted with an X.

The water repellant composition may be a substantially pure silane or siloxane or combinations thereof, or the water repellant composition may be a silane or siloxane or combinations thereof in a hydrocarbon, alcohol or other solvent. In one preferred embodiment of the present invention, the water repellant composition is a pure silane or siloxane, not in a hydrocarbon or alcohol or other solvents such as glycol, so the present invention provides a means of applying a silane or siloxane to a structure to be rendered water repellant utilizing a water carrier thereby eliminating the use of hydrocarbon, alcohol or other solvents which may not be desirable in some applications.

Silane and siloxane compositions incorporating other components are disclosed in U.S. Pat. No. 5,120,581 and U.S. Pat. No. 4,960,615, the disclosures of which specifically are incorporated herein by reference.

A catalyst may be added to the water repellant composition. Effective catalysts can be titanium acetylacetonate (TIAA) and/or dibutyl tin dilaurate (DBTDL). It has been found that the active ingredient in a pure form or in a medium and a catalyst of only dibutyl tin dilaurate is effective for treating concrete or masonry and the amount of the active ingredient can be substantially reduced. However, this composition was not as effective for treating carbon central structures, such as concrete.

Further, it has been found that the active ingredient in a pure form or in a medium and a catalyst of only titanium acetylacetonate is effective for treating carbon central structures. However, this composition was not as effective for treating siliceous structures.

However, a water repellant composition comprising the active ingredient in a pure form or in a medium and a catalyst of dibutyl tin dilaurate and/or titanium acetylacetonate has been found to be effective in treating siliceous structures as well as carbon central structures to render such structures water repellant.

The catalyst, dibutyl tin dilaurate and/or titanium acetylacetonate, can be present in the water repellant composition in a range from less than about one percent (1%) to about twenty-five percent (25%) by weight of the active ingredient. Solutions or emulsions or dispersions containing as little as about one (1%) to about twenty five percent (25%) by weight of the active ingredient have been found to be effective for treating siliceous and carbon central structures for rendering such structures substantially water repellant.

The present invention is useful for treating siliceous structures and/or carbon central structures having available hydroxy (OH) groups. Siliceous structures include such structures as commonly referred to as concrete and masonry, and such compounds as perlite. Carbon central structures as used herein means structures that are characterized by a central carbon atom as opposed to a central silicon atom in siliceous structures, and which have available hydroxy groups. These carbon central structures can be either organic such as leather, paper or wood, or inorganic such as limestone. The term "siliceous structure and/or carbon central structure" as used herein includes soil since the present invention also is useful for treating soil for soil stabilization and adobe or rammed earth structures because the present invention is useful for treating adobe or rammed earth bricks for water repellency.

As used herein "medium" means a carrier such as alcohol, water, water based paint, hydrocarbon or glycol or a combination thereof which may be mixed with the water repellant composition. In the present invention, the water repellant composition is either essentially pure or mixed with a medium, as the term "medium" is used herein, and is additionally mixed with water and/or water based paint and applied to the surface to be treated. The present invention is not limited to any particular medium, but if the water repellant composition and medium are additionally mixed with water alone, the medium should include a paint.

The present invention contemplates applying a water repellant composition in a generally continuous process with paint. If a water based paint is used the water contained within the paint may constitute all, or a substantial part of the water carrier of the water repellant composition. If the water repellant composition is applied in conjunction with water based paint components (the materials and compounds of water based paint without, or substantially without the water), a source of water must be supplied to act as the water carrier of the water resistant composition, the supplied water additionally acting to supply the water component for the water based paint.

If the water repellant composition is applied in conjunction with a solvent based paint, a source of water must be supplied to act as the water carrier of the water resistant composition. If the water repellant composition is applied in conjunction with solvent based paint components (the materials and compounds of solvent based paint without, or substantially without, the solvent), an additional source of water must be supplied to act as the water carrier of the water repellant composition. In this case, additional compositions, such as, for example, surfactants, may have to be added to the supplied water, the water repellant composition, or the solvent based paint components to allow the supplied water to solvate the solvent based paint components.

Ordinarily silanes or siloxanes may not be solvated in water and stored for any period of time, because the water causes the silane or siloxane to condense. U.S. Pat. No. 4,648,904, which is incorporated herein by reference, discloses aqueous silane emulsions which may be manufactured and stored. In accordance with the present invention, aqueous silane or siloxane emulsions may be applied in conjunction with a water based paint or a solvent based paint, with the paint acting as a carrier, or aqueous silane or siloxane emulsions may be applied in conjunction with water or solvent based paint, with an additional source of water acting as the carrier.

As illustrated in FIG. 1, the method of the present invention may be carried out by providing a pressurized water source 10 and a paint and water repellant composition source 12. A pressurized water stream 14 is passed from the pressurized water source 10 into a venturi-orifice 16. A paint and water repellant composition stream 18 is passed from the paint and water repellant composition source 12 through a meter device 20 into the venturi-orifice 16.

The metering device 20 meters the amount of paint and water repellant composition being passed from the paint and water repellant composition source 12 into the venturi-orifice 16. The water in the water stream 14 is mixed with the paint and water repellant composition in the paint and water repellant composition stream 18 in the venture-orifice 16 in a stream 22 and though a spray nozzle 24. The mixture comprising the paint and water repellant composition and water is passed from the spray nozzle 24 in a stream 26 onto an object or surface designated in FIG. 1 by the reference number 28.

The venturi-orifice 16 utilizes the pressure in the pressurized water source 10 to pump or suck the paint and water repellant composition from the paint and water repellant source 12 through the metering device 20. The venturi-orifice 16 may be a typical venturi structure or may simply comprise an orifice. The venturi-orifice 16 also functions to facilitate the thorough mixing of the water and the paint and water repellant composition. The venturi-orifice 16 also may function as the spray nozzle 24 and, in this instance, the spray nozzle 24 may be eliminated.

It is important to thoroughly mix the water and the paint and water repellant composition prior to the mixture being applied to the object or surface 28 in order to effectively treat the object or surface 28 with paint and water repellant composition. The water serves as a carrier to carry the paint and water repellant composition to the object or surface 28 and the water functions to facilitate the penetration of the paint and water repellant composition into the structure to be treated. The water acts as a dilutant and carrier for the paint and water repellant composition.

In FIG. 1, if the paint and water repellant composition source 12 is located in a single container, the paint must comprise a solvent based paint, solvent based paint components, or water based paint components. However, if an aqueous silane or siloxane emulsion is used as the water repellant composition, the paint may additionally comprise a water based paint. Alternately, the paint and water repellant composition source 12 may be located in two containers, one containing water based paint and one containing water repellant composition, the paint stream from one container being combined in any appropriate manner with the water resistant composition stream from the other container prior to the combined water resistant composition/paint stream passing to the metering device 20 and/or the venture-orifice 16.

In one embodiment, the pressurized water source 10 may be the pressurized water source commonly available at water outlets at commercial, residential or other structures. In this embodiment, the pressurized water stream 14 is carried to the venturi-orifice 16 through a common garden hose.

There are various and numerous commercially available devices which are connectable to the pressurized water source at commercial, residential or other structures and which include a venturi-orifice as the venturi-orifice 16 and a siphon tube connected to the venturi-orifice 16 wherein the siphon tube is disposable in a container containing a liquid such as the paint and water repellant composition for passing the paint and water repellant composition stream 18 to the venturi-orifice 16. These commercially available devices or dispensers also commonly include metering means such as the metering device 20 for metering the amount of paint and water repellant composition to be passed to the venturi-orifice 16. One commercially available device which might be used in the system illustrated in FIG. 1 is commercially available from Gilmore Manufacturing Company of Summerset, Pa. and is referred to by their designation "insecticide and fertilizer sprayer with metering dial". In this embodiment, the present invention contemplates a method for applying paint and water repellant composition to the object or surface 28 utilizing a commercially available sprayer connected to a garden hose which is connected to the pressurized water source at a commercial or residential or other structure.

Nothing stated herein should be interpreted to mean or infer that commercially available sprayers have been used in the past for applying paint and water repellant composition. Such sprayers commonly have been used for applying herbicides, insecticides or fertilizers to living foliage.

Schematically shown in FIG. 2 is one other embodiment of the method of the present invention. As shown in FIG. 2, a paint stream 30 is passed from a pressurized paint source 32 through a metering device 34. A pressurized water repellant composition stream 36 is passed from a pressurized water repellant composition source 38 through a metering device 40. The pressurized paint stream 30 and the pressurized water repellant composition stream 36 are combined for mixing the water repellant composition with the paint, and a combined paint and water repellant composition stream 42 is passed through a spray nozzle 44. A combined paint and water repellant composition stream 46 is passed from the spray nozzle 44 onto an object or surface 48. In this embodiment, the pressurized paint source 32 will utilize a water base paint.

Yet another embodiment illustrating the method of the present invention is shown in FIG. 3 wherein a paint stream 50 is supplied from a paint source 52 through a metering device 54. Heat from a heat source 56 is applied to the paint stream 50 for heating the paint stream 50 which may be desired in some applications. A water repellant composition stream 58 is supplied from a water repellant composition source 60 through a metering device 62. Heat from a heat source 64 is applied to the water repellant composition stream 58 for heating the water repellant composition. In this embodiment, the paint source 52 will utilize a water based paint.

The paint supply stream 50 and the water repellant composition stream 58 are passed into each other and mixed to some degree to form a mixture of paint and water repellant composition stream 66 which is supplied to the inlet of a pump 68. The pump 68 pumps the mixture of paint and water repellant composition and outputs a dispersion of paint and water repellant composition stream 70 which is passed through a nozzle 72 and applied to an object or surface 74. In addition to providing a source of energy for pumping the mixture of paint and water repellant composition, the pump 68 also functions to complete the thorough mixing of the paint and the water repellant composition prior to the mixture being applied to the structure to be treated 74.

As shown in FIG. 3, heat from a heat source 76 is applied to the mixture stream 70 for heating the mixture stream 70 prior to the mixture stream 70 being applied to the object or surface 74 which may be desired in some instances.

It should be noted that it may be desirable in some applications to eliminate any or all of the heat sources 56, 64 or 76. For example, only the heat source 76 may be required in some applications or only the heat source 56 may be required in some applications or only the heat source 56 and 64 may be required in some applications.

In its simplest form, the present invention comprises adding a portion of water repellant composition and a portion of paint to a container, agitating the container, and immediately pouring or spraying the resulting mixture or dispersion onto the surface to be painted and rendered water repellant.

It is known in the art that many types of solvent based paint exhibit superior adhesion to a surface if the paint is applied to a surface that has been treated with silane or siloxane. By mixing silane, siloxane, or another water repellant composition with paint in accordance with the present invention, additional benefits are secured.

Heretofore, it was difficult or impossible to apply water based paint to a surface which had been previously treated with a silane or siloxane, because the silane or siloxane had a tendency to repel the water contained in the water based paint, thus preventing the water based paint from attaching or adhering to a surface or object. The present invention allows the benefit of treatment with both a water based paint and a water repellant composition to be secured. Additionally, the ability to paint and waterproof in one step not only reduces application costs, it also reduces the time that an area must be secured from traffic because of maintenance. Furthermore, the high degree of mixing between the water repellant composition and paint results in adhesion of the paint to a surface or object that is superior to that which could be obtained by applying the water repellant composition and the paint separately.

The high degree of mixing between the water repellant composition and the paint allows the paint to benefit from the high degree of penetration of the water repellant composition into a siliceous or carbon central surface or object with the result that the paint is more resistant to the effects of weather and wear. Moreover, the mixing of the water repellant composition and the paint results in an increased ability of the paint to resist penetration by water.

The weight of the water or solvent included in water or solvent based paint adds significantly to the cost of the paint when the paint is transported. By allowing water based paint components or solvent based paint components to be manufactured and shipped without the water or solvent the paints ordinarily contain, paint related shipping costs may be substantially reduced.

Where the mixture of paint and water repellant composition is applied under pressure either because the paint source is pressurized or because the water repellant composition source is pressurized or both or because the mixture is pumped and outputted under pressure, it may be possible to eliminate the cleaning of the surface of the structure to be treated utilizing the process of the present invention. The pressurized mixture of paint and water repellant composition applied to the structure to be treated simultaneously would clean the surface of the structure to be treated sufficiently to permit the water repellant composition to migrate into the structure to be treated. It is not necessary that the surface of the structure to be treated be cleaned in an ordinary sense, but rather that the debris be moved so that the paint and water repellent composition will have access to the surface of the structure to be treated for proper application.

In accordance with the present invention, the mixture of paint and water repellant composition is applied to the structure to be treated in a continuous process about immediately after mixing the paint and the water repellant composition. In some instances, depending on the length of conduits or hoses, various times will elapse between the mixing of the paint and the water repellant composition and the applying of the mixture to the structure to be treated. The exact time is not significant as long as the mixture is applied in a substantially continuous process after the mixing of the paint and water repellant composition at the site. The mixture of paint and water repellant composition is applied to the structure to be treated prior to substantial condensation of the water repellant composition. In other words, the silane or siloxane, or other water repellant composition molecules are highly dispersed in water contained in the paint or from a supplied source, and therefore the tendency is for the silane or other molecules to react with or adhere to the substrate to be treated rather than with one another to form polymers or otherwise coalesce. In most applications, it is contemplated that the mixture or dispersion of paint and water repellant composition or water, water repellant composition will be applied to an object or surface within a time range from about less than five seconds to about less than five minutes. Primarily, it is important to apply the dispersion before substantial condensation of the silane or siloxane occurs.

In some applications, the paint and the water repellant composition may be mixed at the site, temporarily stored in a chamber at the site and subsequently applied to the structure to be treated and, in this instance, this is considered to be applied in a continuous process at the site. The use of the term "in a continuous process at the site" as used herein is intended to distinguish the present process from applications where water repellant composition and water based paint are mixed in some manner, stored in containers and shipped to the site for subsequent application to the structure to be treated. The methods of the present invention do not include or encompass the method just described in the last preceding sentence. However, mixtures of water repellant composition and solvent based paint, mixtures of water repellant composition and solvent based paint components, and mixtures of water repellant composition and water based paint components may be made and stored off site, and subsequently used on site in accordance with the present invention.

In some applications, it may be difficult to achieve a uniform disposition of the paint and water repellant composition mixture upon an object or surface, resulting in non-uniform water repellant properties or unsightly appearance. A dispersing agent may therefore be added to the paint, the water, the water repellant composition, or a combination of these to cause a more uniform distribution of the paint and water repellant composition mixture. Additionally or alternately, a dispersing device may be utilized to more uniformly distribute the paint and water repellant composition mixture. The use of dispersing devices and dispersing agents is shown in U.S. Pat. No. 5,068,132, the disclosure of which is hereby incorporated by reference. Additionally, the disclosure of U.S. Pat. No. 4,931,319 is also incorporated by reference.

Changes may be made in the steps or in the sequence of steps of the methods described herein without departing from the spirit and scope of the invention as defined in the following claims.

What is claimed is:

1. A method for treating a siliceous and or carbon central object with a mixture of a water based paint and a water repellant composition, comprising the steps of:

mixing an effective amount of the water resistant composition with the water based paint to obtain a mixture of paint and water resistant composition;

applying the mixture of paint and water resistant composition to an object after the water repellant composition and the paint are mixed; and wherein the water repellant composition comprises a silane or siloxane or combinations thereof, wherein the Silane has the general formula:

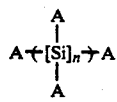

wherein the siloxane has the general formula:

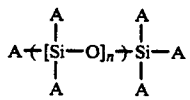

wherein Si is silicon; 0 is oxygen; n is a positive integer; and A is selected from the group consisting of H, R, X, or Y wherein H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen;

Y is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substitutent contains from about 4 to about 8 carbon atoms, the aklyl substituent contains up to about 8 carbon atoms and the alkenyl substituent contains up to about 8 carbon atoms.

2. The method of claim 1 wherein the silane or siloxane further comprises a Y substituted with an X.

3. The method of claim 1 wherein the silane or siloxane further comprises at least one R substituted with an X.

4. The method of claim 1 wherein the mixture of paint and water repellant composition is further dispersed by disposing an effective amount of a dispersing agent in the mixture of paint and water repellant composition capable of dispersing the mixture of paint and water repellant composition sufficiently to enhance the area of the object treated with the mixture of paint and water repellant composition.

5. The method of claim 1 wherein the mixture of paint and water repellant composition is further dispersed by disposing an effective amount of a dispersing agent in the paint capable of dispersing the mixture of paint and water repellant composition sufficiently to enhance the area of the object treated with the mixture of paint and water repellant composition.

6. The method of claim 1 wherein the mixture of paint and water repellant composition is further dispersed by mixing simultaneously the paint, the water repellant composition, and a dispersing agent, wherein the dispersing agent is capable of dispersing the mixture of paint and water repellant composition sufficiently to enhance the area of the object treated with the mixture of paint and water repellant composition.

7. The method of claim 1 wherein the mixture of paint and water repellant composition is further dispersed by introducing the mixture of paint and water repellant composition through a dispersing device capable of dispersing the mixture of paint and water repellant composition sufficiently to enhance the area of the object treated with the mixture of paint and water repellant composition.

8. The method of claim 7 wherein the mixture of paint and water repellant composition is further dispersed by introducing the mixture of paint and water repellant composition and a dispersing agent through the dispersing device.

9. The method of claim 1, wherein the step of applying the mixture of paint and water repellant composition further comprises applying the mixture within about 5 seconds to about 5 minutes after the paint and the water based composition are mixed.

10. The method of claim 1 wherein the step of applying the mixture of paint and water repellant composition further comprises applying the mixture before substantial condensation of the silane or siloxane comprising the water repellant composition occurs.

11. The method of claim 1 wherein the step of mixing the water repellant composition with the paint is defined further to include the steps of:

passing the water repellant composition under pressure via a water repellant composition stream;

passing the paint in a paint stream;

mixing the paint with the water repellant composition under pressure to form the mixture of paint and water repellant composition; and wherein the step of applying the mixture to the object is defined further to include the step of passing the dispersion of water repellant composition and paint under pressure onto the object.

12. The method of claim 11 wherein the step of applying the mixture to the object is defined further as passing the mixture of paint and water repellant composition through a spray nozzle, with the mixture of paint and water repellant composition from the spray nozzle being passed onto the object.

13. The method of claim 1 wherein the step of mixing the water repellant composition with the paint is defined further to include the steps of:

passing the paint under pressure via a paint stream;

passing the water repellant composition into the paint stream for mixing with the paint; and wherein the step of applying the mixture to the object is defined further to include the step of passing the dispersion of water repellant composition and paint under pressure onto the object.

14. The method of claim 1 wherein the step of mixing the water repellant composition with the paint is further defined to include the steps of:

passing the paint in a paint stream to a pump;

passing the water repellant composition in a water repellant composition stream to the pump;

combining the paint stream and the water repellant composition stream prior to or simultaneously with passing the paint and the water repellant composition to the pump; and passing the mixture of paint and water resistant composition through the pump;

pumping the mixture of paint and water repellant composition onto the object.

15. The method of claim 14 defined further to include the step of metering the paint in the paint stream to provide a predetermined amount of paint prior to mixing the paint and the water repellant composition.

16. The method of claim 14 defined further to include the step of metering the water repellant composition prior to mixing the paint and the water repellant composition for providing a predetermined amount of waster repellant composition for mixing with the paint.

17. A method for treating a siliceous and or carbon central object with a mixture of paint and water repellant composition, comprising the steps of:

passing water under pressure through a venturi-orifice;

mixing a paint and a water repellant composition, forming thereby a mixture of paint and water resistant composition;

passing the mixture of paint and water repellant composition into the venturi-orifice for mixing with the water to form a dispersion of water, paint and water repellant composition; and passing the dispersion of water, paint, and water repellant composition from the venturi-orifice onto the object after mixing the paint and the water repellant composition.

18. The method of claim 17, wherein the step of applying the mixture of paint and water resistant composition further comprises applying the mixture within about 5 seconds to about 5 minutes after the paint and the water based composition are mixed.

19. The method of claim 17 wherein the step of applying the mixture of paint and water resistant composition further comprises applying the mixture before substantial condensation of the silane or siloxane comprising the water repellant composition occurs.

20. The method of claim 17 wherein the mixture of paint and water repellant composition is further dispersed by disposing an effective amount of a dispersing agent in the mixture of paint and water repellant composition.

21. The method of claim 17 wherein a dispersing agent is added to the water under pressure.

22. The method of claim 17 wherein the dispersion of water, paint and water repellant composition is further dispersed by introducing the dispersion of water, paint and water repellant composition through a dispersing device capable of dispersing the dispersion of water, paint and water repellant composition sufficiently to enhance the area of the object treated with the dispersion of water, paint and water repellant composition.

23. The method of claim 22 wherein the dispersion of water, paint and water repellant composition is further dispersed by introducing the dispersion of water, paint and water repellant composition and a dispersing agent through the dispersing device.

24. The method of claim 17 defined further to include the step of passing the dispersion of water, paint and water resistant composition through a spray nozzle, with the dispersion of water, paint and the water repellant composition from the spray nozzle being passed onto the object.

25. The method of claim 17 defined further to include the step of metering the mixture of paint and water repellant composition passed to the venturi-orifice for mixing a predetermined amount of the mixture of paint and water repellant composition with the water being passed through the venturi-orifice.

26. The method of claim 17 wherein the paint comprises a solvent based paint.

27. The method of claim 17 wherein the paint comprises solvent based paint components.

28. The method of claim 17 wherein the paint comprises water based paint components.

29. The method of claim 17 wherein the water repellant composition comprises an aqueous silane or siloxane emulsion.

30. The method of claim 29 wherein the paint comprises a water based paint.

31. The method of claim 17 wherein the paint and the water repellant composition are located in separate containers.

32. The method of claim 31 wherein the paint comprises a water based paint.

33. The method of claim 17 wherein the water repellant composition comprises a silane or siloxane or combinations thereof, and wherein the silane has the general formula:

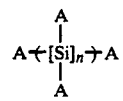

wherein the siloxane has the general formula:

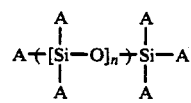

wherein Si is silicon; O is oxygen; n is a positive integer; and A is selected from the group consisting of H, R, X, or Y H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms.

34. The method of claim 33 wherein the silane or siloxane further comprises a Y substituted with an X.

35. The method of claim 33 wherein the silane or siloxane further comprises at least one R substituted with an X.

36. A method for applying a mixture of paint and water repellant composition to an object using a garden hose connectable to a water outlet and a dispenser adapted to hold a quantity of the mixture of paint and water repellant composition and being connectable to the garden hose for passing the mixture of paint and water repellant composition into the water running through the garden hose comprising the steps of:
mixing a paint and a water repellent composition, forming thereby a mixture of paint and water repellant composition;
placing a quantity of the mixture of paint and water repellant composition in the dispenser;
connecting the dispenser to the garden hose;
passing water through the garden hose so the mixture of paint and water repellant composition from the dispenser is mixed with the water to obtain a dispersion of water, paint and water repellant composition;
passing the dispersion from the garden hose onto an object.

37. The method of claim 36 wherein the water repellant composition comprises a silane or siloxane or combinations thereof, and wherein the silane has the general formula:

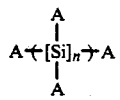

wherein the siloxane has the general formula:

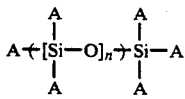

wherein Si is silicon; 0 is oxygen; n is a positive integer; and A is selected from the group consisting of H, R, X, or Y wherein
H is a hydrogen atom;
R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;
X is selected from a group consisting of a halogen, hydroxyl group, OR group wherein O is oxygen, a carboxylic group, or RNR or RNH wherein N is nitrogen
Y is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substitutent contains from about 4 to about 8 carbon atoms, the aklyl substituent contains up to about 8 carbon atoms and the alkenyl substituent contains up to about 8 carbon atoms.

38. The method of claim 37 wherein the silane or siloxane further comprises a Y substituted with an X.

39. The method of claim 37 wherein the silane or siloxane further comprises at least one R substituted with an X.

40. The method of claim 36 wherein the step of passing the dispersion onto an object further comprises passing the dispersion within about 5 seconds to about 5 minutes after the dispersion is mixed.

41. The method of claim 36 wherein the step of passing the dispersion onto an object further comprises passing the dispersion before substantial condensation of the silane or siloxane comprising the water repellent composition occurs.

42. The method of claim 36 wherein the paint comprises a solvent based paint.

43. The method of claim 36 wherein the paint comprises solvent based paint components.

44. The method of claim 36 wherein the paint comprises water based paint components.

45. The method of claim 36 wherein the water repellant composition comprises an aqueous silane or siloxane emulsion.

46. The method of claim 45 wherein the paint comprises a water based paint.

47. A method for applying a mixture of water based paint and water repellant composition to an object using a garden hose connectable to a water outlet, to a first dispenser applied to hold a quantity of the water based paint, and to a second dispenser adapted to hold a quantity of the water repellant composition, comprising the steps of:
connecting the water hose to the water outlet, the first dispenser, and the second dispenser;
placing a quantity of the paint in the first dispenser;
placing a quantity of the water repellant composition in the second dispenser;
passing water through the garden hose so the paint from the first dispenser and the water repellant composition from the second dispenser are mixed with the water to obtain a dispersion of water, paint, and water repellant composition; and
passing the dispersion from the garden hose onto an object after the paint and the water repellant composition are mixed.

48. The method of claim 47 wherein the water repellant composition comprises a silane or siloxane or combinations thereof, and wherein the silane has the general formula:

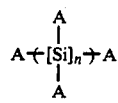

wherein the siloxane has the general formula:

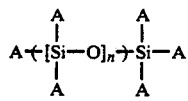

wherein si is silicon; O is oxygen; n is a positive integer; and A is selected from the group consisting of H, R, X, or Y wherein H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen Y is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substitutent contains from about 4 to about 8 carbon atoms, the aklyl substituent contains up to about 8 carbon atoms and the alkenyl substituent contains up to about 8 carbon atoms.

49. The method of claim 48 wherein the silane or siloxane further comprises a Y substituted with an X.

50. The method of claim 48 wherein the silane or siloxane further comprises at least one R substituted with an X.

51. The method of claim 47 wherein the step of passing the dispersion onto an object further comprises passing the dispersion within about 5 seconds to about 5 minutes after the paint and the water based composition are mixed.

52. The method of claim 47 wherein the step of passing the dispersion onto an object further comprises passing the dispersion before substantial condensation of the silane or siloxane comprising the water repellant composition occurs.

* * * * *

UNITED STATES PATENT AND TRADEMARK OFFICE
CERTIFICATE OF CORRECTION

PATENT NO. : 5,316,799

DATED : May 31, 1994

INVENTOR(S) : Brunken, et al

Page 1 of 2

It is certified that error appears in the above-indentified patent and that said Letters Patent is hereby corrected as shown below:

Column 1, line 10, please delete the word "a", and substitute therefore the word --an--.

In the Drawing, Figure 2, please insert the reference number --40-- as illustrated on the drawing below.

UNITED STATES PATENT AND TRADEMARK OFFICE
CERTIFICATE OF CORRECTION

PATENT NO. : 5,316,799
DATED : May 31, 1994
INVENTOR(S) : Brunken, et al

It is certified that error appears in the above-indentified patent and that said Letters Patent is hereby corrected as shown below:

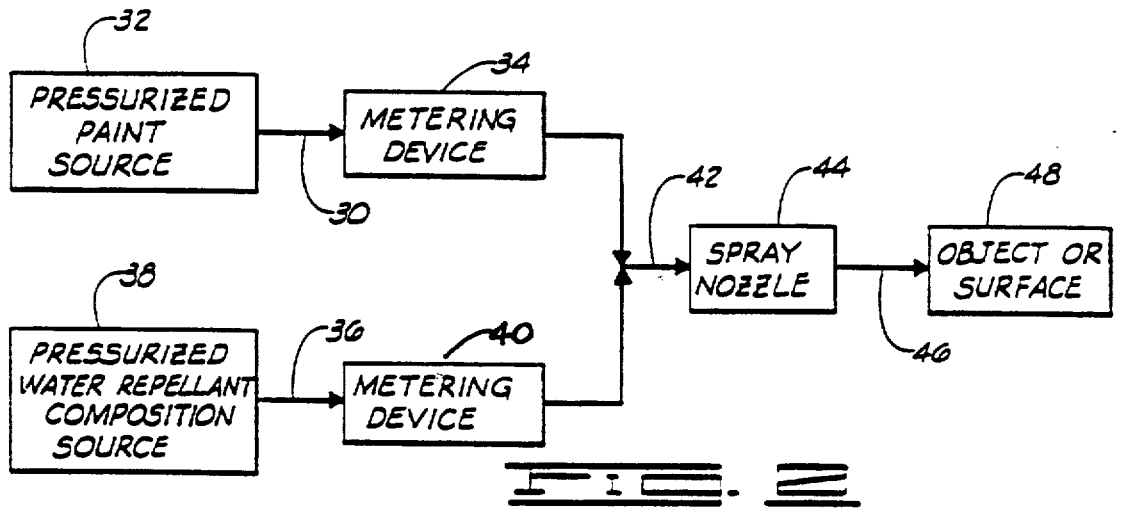

Signed and Sealed this

Sixth Day of December, 1994

Attest:

BRUCE LEHMAN

Attesting Officer     Commissioner of Patents and Trademarks